May 15, 1956  C. W. MORGAN  2,745,705
REFRESHMENT TRAY FOR AUTOMOBILE INSTRUMENT PANEL
Filed May 29, 1953
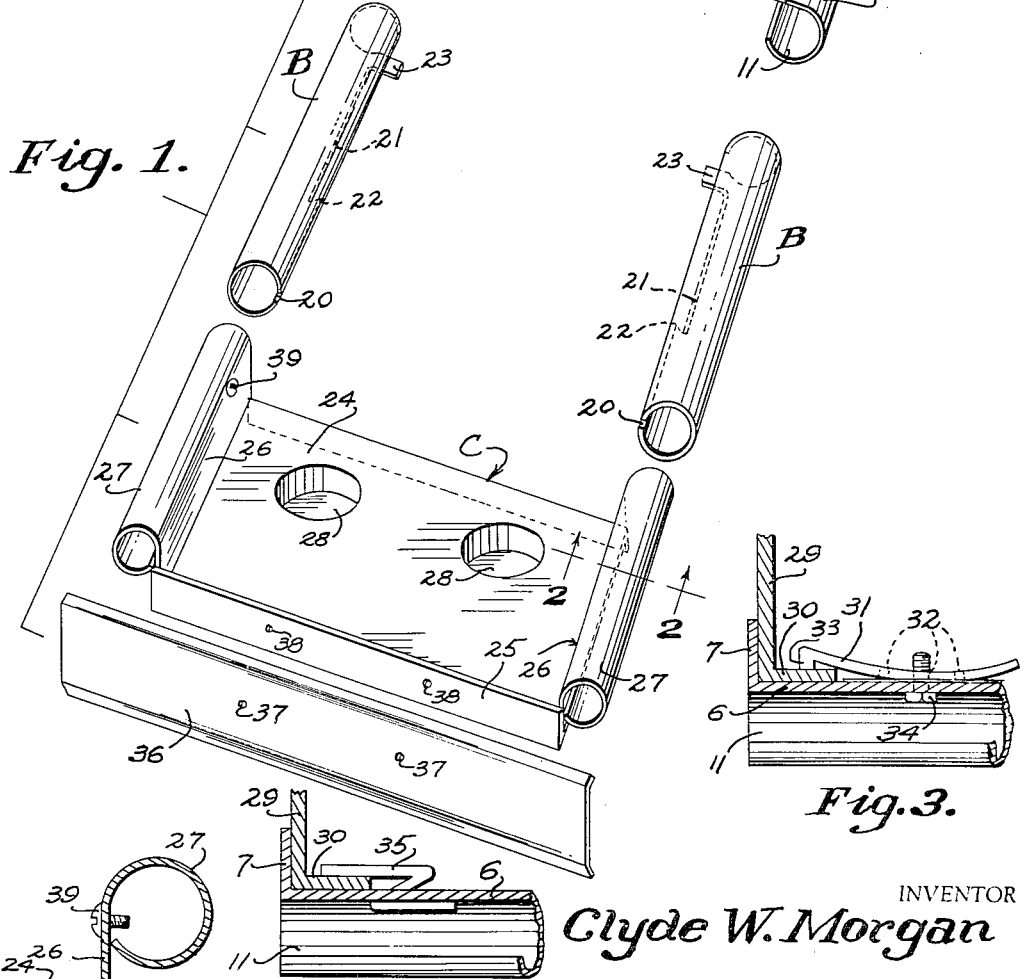
INVENTOR
Clyde W. Morgan
BY [signature]
ATTORNEYS

United States Patent Office 2,745,705
Patented May 15, 1956

2,745,705

REFRESHMENT TRAY FOR AUTOMOBILE INSTRUMENT PANEL

Clyde W. Morgan, Dallas, Tex.

Application May 29, 1953, Serial No. 358,429

6 Claims. (Cl. 311—21)

Generically this invention relates to slidable tray structures, but more particularly it is directed to a refreshment tray assembly adapted for attachment to the instrument panel structure of an automobile.

This invention embodies improvements on my Patent No. 2,435,151, issued January 27, 1948, for Automobile Refreshment Tray, and while this tray has proved satisfactory and has been warmly accepted by the trade, practice has shown certain inherent structural disadvantages and defects, which the improvements of the instant invention are designed to overcome.

In order to install the patented device, it is necessary to take it to a service garage or automobile repair shop where the proper tools are available for the service man to attach the device to the instrument panel structure, and, therefore, an important object of this invention is to construct a tray and mounting structure therefor, the parts of which interfit telescopically in a manner such that the resulting assembly can be readily installed in operative position in connection with the instrument panel structure of an automobile by an unskilled person.

Another important object of this invention is the provision of means for readily mounting the tray-supporting structure under the cowl to the instrument panel, rigidly anchoring the supporting structure in operative position by the use of only an ordinary wrench and without any modification whatever to the existing structure.

A further important object of this invention is the provision of a tray section constructed from one piece of material having an integral front wall portion defining the depth of the tray, and side wall portions terminating at their upper edges in off-set tubular members adapted to telescope into oppositely slotted cylindrical members, which in turn are telescopically received in complemental side members of the rigidly mounted tray supporting structure, coacting means for preventing complete detachment of the telescopic members from the supporting structure, and means for normally preventing complete separation of the tray portion from its telescoping members, such structural arrangement providing an additional extensible range, and at the same time being adapted to rigidly support the tray in extended position.

A further important object of this invention is the provision of a simple adjustable rod means for rigidly attaching the rear edge of the tray supporting structure to the instrument panel and simple clamp means for securing the front end of the supporting shell to the instrument panel structure of the automobile without modification of existing structure.

With these and other objects in view, which will become apparent as the description proceeds, the invention resides in the construction, combination, and the arrangement of parts, hereinafter more fully described and claimed, and illustrated in the accompanying drawings, in which drawings like characters of reference indicate like parts throughout the several figures, of which:

Fig. 1 is an unassembled perspective view of the refreshment tray and supporting structure.

Fig. 2 is a fragmentary vertical cross section taken on the line 2—2 of Fig. 1, looking in the direction of the arrows.

Fig. 3 is a fragmentary vertical sectional view of the tray support and instrument panel with the clamping assembly in elevation.

Fig. 4 is a similar view to Fig. 3 showing a modified clamp means.

Fig. 5 is a perspective view of a modified form of rod means for attaching the rear end of the tray-supporting structure to the automobile structure.

In the illustrated embodiment characterizing this invention, there is shown a substantially rectangular tray-supporting shell or frame structure A formed from one piece of material comprising a flat body portion 6 with a front end portion 7 bent upwardly to form a vertical upstanding end piece, which, in the present instance, is formed with an arcuate cut-out portion 8 centrally of its length. A rear end portion 9 similar to end 7 is turned down with respect to said body portion forming a strengthening end edge. The opposite sides of said body portion substantially at the ends of the member 7 are bent outwardly and around inwardly as at 10 to form semi-cylindrical tubular members 11. A plate or collar 12 having an upstanding semi-tubular portion 13 adapted to slidably house a threaded rod 14 is welded or otherwise secured to the upper surface of body 6 flush with its rear edge. Mounted on the projecting end of rod 14 is a threaded nut 15 for a purpose directly more fully appearing. Contiguous to the front end portion 7 and spaced inwardly from the side edges of the body portion are located a series of spaced apertures 16 and an adjacent series of spaced slot openings 17. The underlying members 11 are formed with recessed edges 18 forming shoulders 19.

Adopted to be mounted in each of the cylindrical tubular members 11 is an intermediate tubular member B formed with a slot 20 extending throughout its length and which is provided with a cut-out portion 21 forming at one end a shoulder 22 and at its opposite end with an inwardly projecting lug 23. When tubular members B are telescopically received in members 11 and are in extended position, lugs 23 engage the shoulders or stops 19 to prevent complete separation of said members B from the supporting structure A.

The tray C is constructed from one piece of material, the rectangular portion 24 forming the bottom of the tray, and the front edge of said bottom being bent upwardly forming the vertical end wall 25 defining the depth of the tray and constituting the front wall. The elongated end portions of the bottom 24 are bent upwardly forming vertical side walls 26 corresponding in height to wall 25, and are then bent around forming the outwardly off-set tubular end members 27, which are adapted for telescoping engagement into the cylindrical members B, and in turn the members B are telescopically engageable with members 11 of the supporting structure A, which places the parts in assembled closed position, with the tray housed by the supporting structure A.

The bottom 24 of the tray is provided with a plurality of wells 28 to receive beverage bottles or the like and retain them in upright position even during movement of the automobile.

To install the device it is only necessary to position the supporting structure A beneath the instrument panel 29 with the end member 7 seating against said panel 29 and the body portion 6 in underlying engagement with the horizontal portion or flange 30 of said panel. Then a curved clamp member 31 which is formed with a series of threaded openings 32 and at one end with a downwardly projecting locking lug 33, is positioned in clamping engagement with the flange 30, with openings 32 in registry with openings 16 in the body portion 6 of the mounting structure A. The threaded screw then is inserted through one of the openings 16 and through the proper aligning opening 32 to securely clamp the structure A to said panel 29. To adjustably support the rear end of the structure A, the threaded rod 14 is slidably adjusted in the tubular portion 13 to engage the free end of said rod with the structure (not shown) of the automobile, in an obvious manner and the nut 15 then is tightened into locking engagement with the plate 12 and the end of the supporting structure or shell A, which completes the mounting in operative position.

Fig. 4 shows a modified form of clamp means comprising a Z-shaped clamping element 35, which, if desired, may be used in place of clamp member 31, the clamping element being mounted in a selected slot opening 17 and brought into clamping engagement with the surface of flange 30 and the lower surface of the body portion 6.

It will be noted that I have provided an effectual but simple means for rigidly mounting the assembly in operative position by means only of a single wrench by an unskilled person and without modification to existing structure.

The tray section C has mounted on end 25 a face plate 36 to present a finished and pleasing appearance and, if desired, it may conform to the finish of the particular car carrying the assembly, said face plate being secured by suitable screws or like fastening means extending through apertures 37 in the face plate and threaded openings 38 in the tray wall 25, which register with apertures 37. Mounted at the upper edges of sidewalls 26 of the tray are the screws 39 which are adapted to extend through the slots 20 of members B.

When the members B are telescopically mounted on tubular members 27 of the tray, the screws 39 threadedly mounted thereon are adapted to engage the shoulders 22, thereby preventing complete separation of the tray from members B in opening direction. The members B are in turn telescopically inserted in members 11 of the shell-supporting structure A, and the lugs 23 of members B normally engage shoulders 19 and prevent complete separation of said members from the supporting structure A. When the tray is in closed position, the member 36 conceals the assembly and serves as a handle means for enabling the parts to be pushed into closed or housed position in the supporting structure A, and, conversely, by slightly pulling on member 36, the tray C and members B are extended to complete open position.

Fig. 5 illustrates a modified form of rod device corresponding to the threaded rod 14, for supporting the rear edge of member A, which rod device comprises a smooth rod 40 slidably mounted in plate 41, similar to plate 12. Mounted on said rod is a coil spring 42 which seats against the plate and also against washer 43, this washer 43 also forming a seat for a bent or crimped locking washer 44, and mounted on the free end of rod 40 is a rubber suction or vacuum cup 45. To secure rear end of member A, it is only necessary to slidably extend the rod 40 and operatively engage the cup 45 with the automobile structure (not shown) and the washer 43 with the spring and compress the spring and the locking washer 44 will retain the spring compressed and the device in locked position.

Practice has proven it is of distinct advantage to substantially increase the extensible range of the tray C with respect to its supporting structure A and at the same time to present a more rigid tray supporting structure when in extended position without materially adding to the size or weight, and yet maintaining a compact assembly, which has been accomplished by the provision of the unique supporting structure and the construction of the tray portion and arrangement of the telescopic interlocking members B.

From the above it will be apparent that I have provided an automobile refreshment tray assembly, compact in form, simple in construction, readily installable by an unskilled person, pleasing in appearance, readily extensible without binding of coacting parts, and adapted to support a capacity refreshment content, yet manufacturable at a minimum cost and efficient for the purposes intended.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is well to emphasize that various minor changes in details of construction, proportion and arrangement of parts, may be resorted to within the scope of the appended claims without departing from or sacrificing any of the principles of the invention.

Having thus described the invention, what I desire protected by Letters Patent is as set forth in the following claims:

1. A refreshment tray assembly for automobiles adapted to support beverage glasses and bottles carried thereby in upright position, comprising a supporting structure including a substantially planar body portion, semi-cylindrical sleeve members depending from opposite sides of the supporting structure having oppositely disposed open portions defining shoulder elements therein, intermediate tubular members telescopically receivable in the semi-cylindrical sleeves and having an outer end and an inner end and provided with opposite longitudinally extending slots terminating in inwardly-directed opposite lugs adjacent to the inner ends of the intermediate tubular members, the said lugs being engageable with the shoulder elements in the semi-cylindrical sleeve members of the supporting structure, and a tray section including a tray portion having opposite upstanding side walls having upper edges carrying outwardly directed tubular slide members telescopically engageable with the intermediate tubular members, cooperating stop means in the said intermediate tubular members and carried by the side walls of the tray section for inhibiting complete removal of the tray section from the intermediate tubular members, and means on the supporting structure for securing said supporting structure in operative position to the structure of an automobile.

2. A refreshment tray assembly for automobiles adapted to support beverage glasses and bottles carried thereby in upright position, comprising in combination a plurality of telescopically interconnected sections, one of which sections is mounting section for the assembly including a substantially planar body shell, semi-cylindrical sleeve members depending from opposite sides of the mounting section having oppositely disposed open portions providing abutment shoulder elements in the said sleeve members, a second section comprising intermediate tubular members telescopically receivable in the members and having an outer end and an inner end and provided with opposite longitudinally extending slots defining abutment shoulders therein, rear portions of the slots being vertically off-set from forwards of the slots for forming the abutment shoulders, oppositely directed lugs on the intermediate tubular members adjacent to the inner ends of the intermediate tubular members for engaging with the abutment shoulders in the semi-cylindrical sleeve members of the mounting section when the intermediate members are telescopically mounted in the said sleeve members and are in fully extended position relative thereto, the said abutment shoulders and lugs cooperating for preventing accidental complete withdrawal of the intermediate members from the said sleeve members, a third section of the assembly being a tray section which comprises a substantially planar tray having opposite upstanding side walls and a front wall connecting the side walls and defining the depth of the tray section, the said side walls having their upper edges bent outwardly and around to form longitudinally extending tubular slide members telescopically receivable into the intermediate tubular members, and stop means carried by the side walls of the tray section for engagement with complemental abutment elements of the intermediate members for preventing complete accidental withdrawal of the tray section from the intermediate members when the tray section is assembled with the intermediate members, the mounting section being a housing for receiving the intermediate members and tray section when these are in retracted position, with the tray of the tray section retracted into the body shell of the mounting section, a front panel on the tray section defining a handle for extending and retracting the tray section and concealing the assembly when the sections are retracted into the mounting section, and means for mounting and adjustably securing the mounting section on the instrument panel and automobile structure.

3. The refreshment tray assembly as claimed in claim 2, wherein the tray section is a unitary structure including a tray body having an integral front wall portion defining the depth of the tray, side wall portions terminating at their upper edges in off-set tubular members telescopically received into the oppositely slotted intermediate cylindrical members, which in turn are telescopically received in complemental tubular side members of the rigidly mounted mounting section, coacting means for preventing complete detachment of the intermediate cylindrical members from the mounting section, and means for normally preventing complete separation of the tray section from the intermediate telescoping members.

4. The refreshment tray assembly as claimed in claim 2, wherein the means for rigidly mounting the assembly on the automobile structure comprises a plate rigidly mounted on the planar body shell of the mounting section, the said plate including a tubular bearing portion, adjustable rod means slidably mounted in the said tubular bearing portion including a rod, means on the rod for rigidly connecting the rod to the automobile structure, and means for securing the front end of the body shell to the instrument panel structure of the automobile without modification to existing structure.

5. The structure defined in claim 4, wherein the adjustable rod means include a threaded rod slidably received in the tubular bearing portion of the plate and a locking nut threadedly mounted on the said rod and engageable with said bearing plate.

6. The tray assembly claimed in claim 2, wherein the body shell of the mounting section is provided with a plurality of series of spaced apertures in front portions of the body shell and spaced inwardly from each side of the body shell and substantially parallel to each side of the said body shell, which also is provided with a plurality of series of spaced slot openings adjacent to the said apertures, the said apertures and slot openings being provided for receiving selected clamping means for rigidly securing the front portions of the body shell to the instrument panel.

References Cited in the file of this patent

UNITED STATES PATENTS

| | | |
|---|---|---|
| 7,789 | Shoenberger | Nov. 19, 1850 |
| 729,078 | Maxwell | May 26, 1903 |
| 825,695 | Beaudet | July 10, 1906 |
| 2,000,916 | Bloom | May 16, 1935 |
| 2,125,476 | Westrope et al. | Aug. 2, 1938 |
| 2,293,364 | Schigut | Aug. 18, 1942 |
| 2,530,876 | Harris | Nov. 21, 1950 |
| 2,546,459 | Lee | Mar. 27, 1951 |
| 2,621,093 | Merhige et al. | Dec. 9, 1952 |
| 2,634,181 | Hunt | Apr. 7, 1953 |